United States Patent
Dutta et al.

(10) Patent No.: US 11,758,536 B2
(45) Date of Patent: Sep. 12, 2023

(54) SIDELINK FR2 BEAM ALIGNMENT OVER DATA SLOTS

(71) Applicant: QUALCOMM Incorporated, San Diego, CA (US)

(72) Inventors: Sourjya Dutta, San Diego, CA (US); Kapil Gulati, Belle Mead, NJ (US); Junyi Li, Chester, NJ (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 204 days.

(21) Appl. No.: 17/137,290

(22) Filed: Dec. 29, 2020

(65) Prior Publication Data

US 2022/0210778 A1 Jun. 30, 2022

(51) Int. Cl.
*H04W 72/20* (2023.01)
*H04W 72/044* (2023.01)
*H04L 5/00* (2006.01)

(52) U.S. Cl.
CPC ........... *H04W 72/20* (2023.01); *H04L 5/0048* (2013.01); *H04W 72/046* (2013.01)

(58) Field of Classification Search
CPC ........... H04W 72/0406; H04W 72/046; H04W 72/20; H04L 5/0048
See application file for complete search history.

(56) References Cited

U.S. PATENT DOCUMENTS

| | | | |
|---|---|---|---|
| 2012/0122392 A1* | 5/2012 | Morioka | H04B 7/0695 455/25 |
| 2018/0249526 A1* | 8/2018 | Nagaraja | H04W 24/08 |
| 2019/0229789 A1* | 7/2019 | Zhang | H04L 27/261 |
| 2020/0186231 A1* | 6/2020 | Cao | H04B 7/063 |
| 2020/0322032 A1* | 10/2020 | Xiang | H04B 7/063 |
| 2021/0168574 A1* | 6/2021 | Zhang | H04L 5/0048 |
| 2021/0219268 A1* | 7/2021 | Li | H04L 1/1887 |
| 2021/0273697 A1* | 9/2021 | Min | H04B 7/0617 |

* cited by examiner

*Primary Examiner* — Jasper Kwoh
(74) *Attorney, Agent, or Firm* — Procopio, Cory, Hargreaves & Savitch LLP

(57) ABSTRACT

A first UE may determine that a BPL with a second UE has degraded below a threshold and generate, based on the determination, a beam training frame for an on-demand beam training procedure. The beam training frame may include a first AGC symbol, SCI indicating that the beam training frame is for beam training, and one or more sets of an AGC symbol and beam sweeping reference signals. The first UE may transmit the beam training frame multiplexed with one or more data frames to the second UE. The second UE may receive the beam training frame for the on-demand beam training procedure based on a determination that the BPL with the first UE has degraded below the threshold.

28 Claims, 12 Drawing Sheets

SIDELINK FR2 BEAM ALIGNMENT OVER DATA SLOTS

BACKGROUND

Technical Field

The present disclosure relates generally to communication systems, and more particularly, to sidelink communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may comprise direct communication between devices based on sidelink, such as in vehicle-to-everything (V2X) and/or other device-to-device (D2D) communication. There exists a need for further improvements in sidelink technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

For sidelink beam training in a distributed network, network-wide/system-wide beam training occasions may be farther apart in time than beam training occasions that are based on a Uu link. The increased time period between the beam training occasions may be provided to reduce overhead associated with establishing and maintaining millimeter wave (mmW) links in the distributed network. However, if a beam pair link (BPL) between a first user equipment (UE) and a second UE degrades or fails, the first UE and the second UE may have to wait until an end of the increased time period for a next scheduled network-wide/system-wide beam training occasion before a condition of the BPL may be remedied.

Accordingly, the first UE may generate a beam training frame for performing an on-demand beam training procedure to improve a condition of the BPL between the first UE and the second UE when the BPL is determined to have degraded but has not yet failed, rather than waiting for a next scheduled network-wide/system-wide beam training occasion to improve the condition of the BPL. The beam training frame may include a beam training reference signal (BTRS) that is multiplexed with one or more data transmissions and may be transmitted on-demand from the first UE to the second UE. Upon performing the on-demand beam training procedure based on the beam training frame that multiplexes the BTRS with the one or more data transmissions, a quality of the BPL between the first UE and the second UE may be improved prior to a time of the next network-wide/system-wide beam training occasion.

In an aspect of the disclosure, a method, a computer-readable medium, and an apparatus are provided. The apparatus may be associated with a first UE and may be configured to determine that a BPL with a second UE has degraded below a threshold; generate, based on the determination that the BPL with the second UE has degraded below the threshold, a beam training frame for an on-demand beam training procedure including a first automatic gain control (AGC) symbol, sidelink control information (SCI) indicating that the beam training frame is for beam training, and one or more sets of an AGC symbol and beam sweeping reference signals (RSs); and transmit the beam training frame multiplexed with one or more data frames to the second UE.

In an aspect of the disclosure, a method, a computer-readable medium, and an apparatus are provided. The apparatus may be associated with a second UE and may be configured to determine that a BPL with a first UE has degraded below a threshold; and receive, based on the determination that the BPL with the first UE has degraded below the threshold, a beam training frame for an on-demand beam training procedure including a first AGC symbol, SCI indicating that the beam training frame is for beam training, and one or more sets of an AGC symbol and beam sweeping RSs, the beam training frame being received with one or more data frames multiplexed with the beam training frame.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
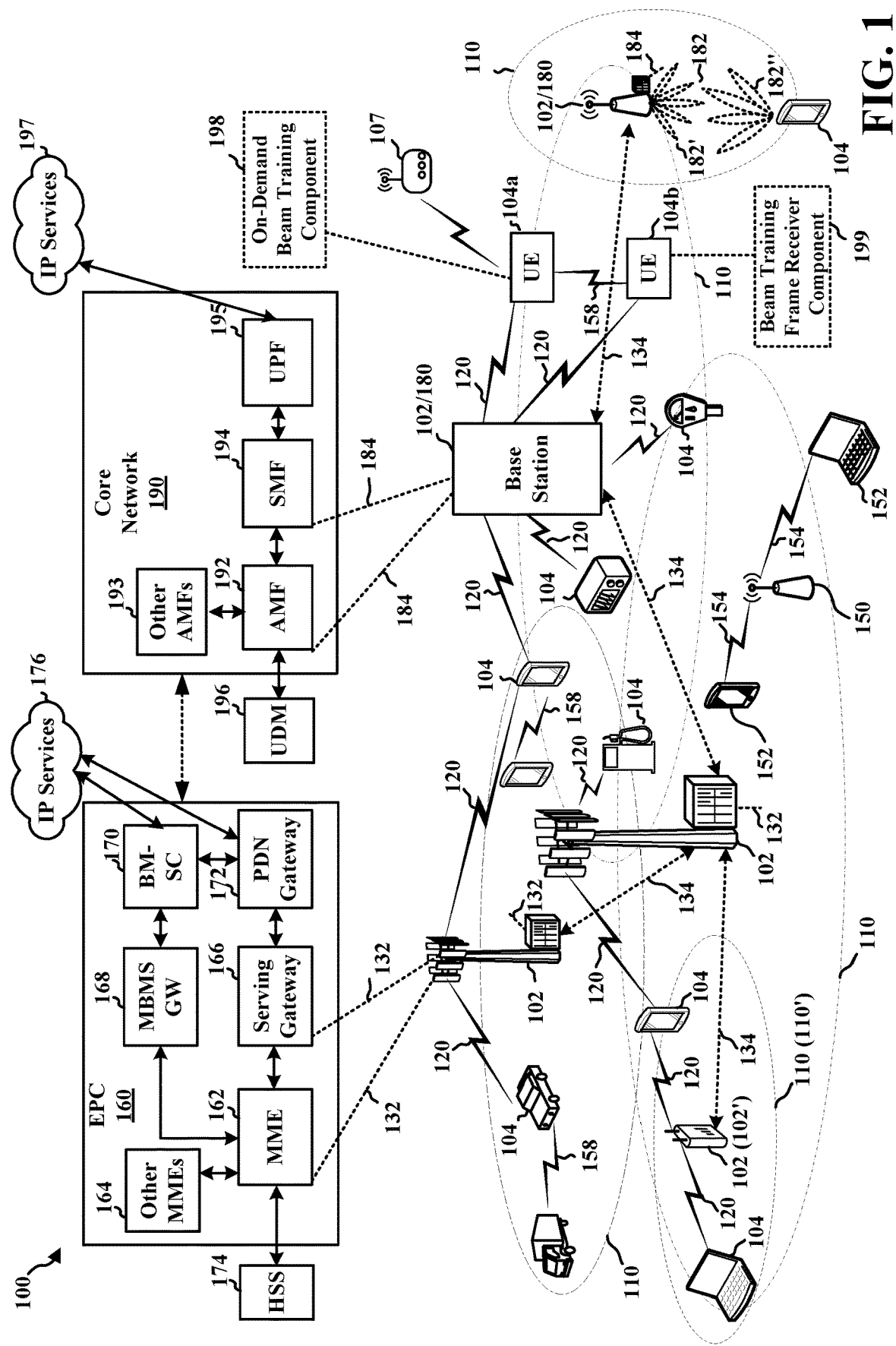
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipments (UEs) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Figure 2:
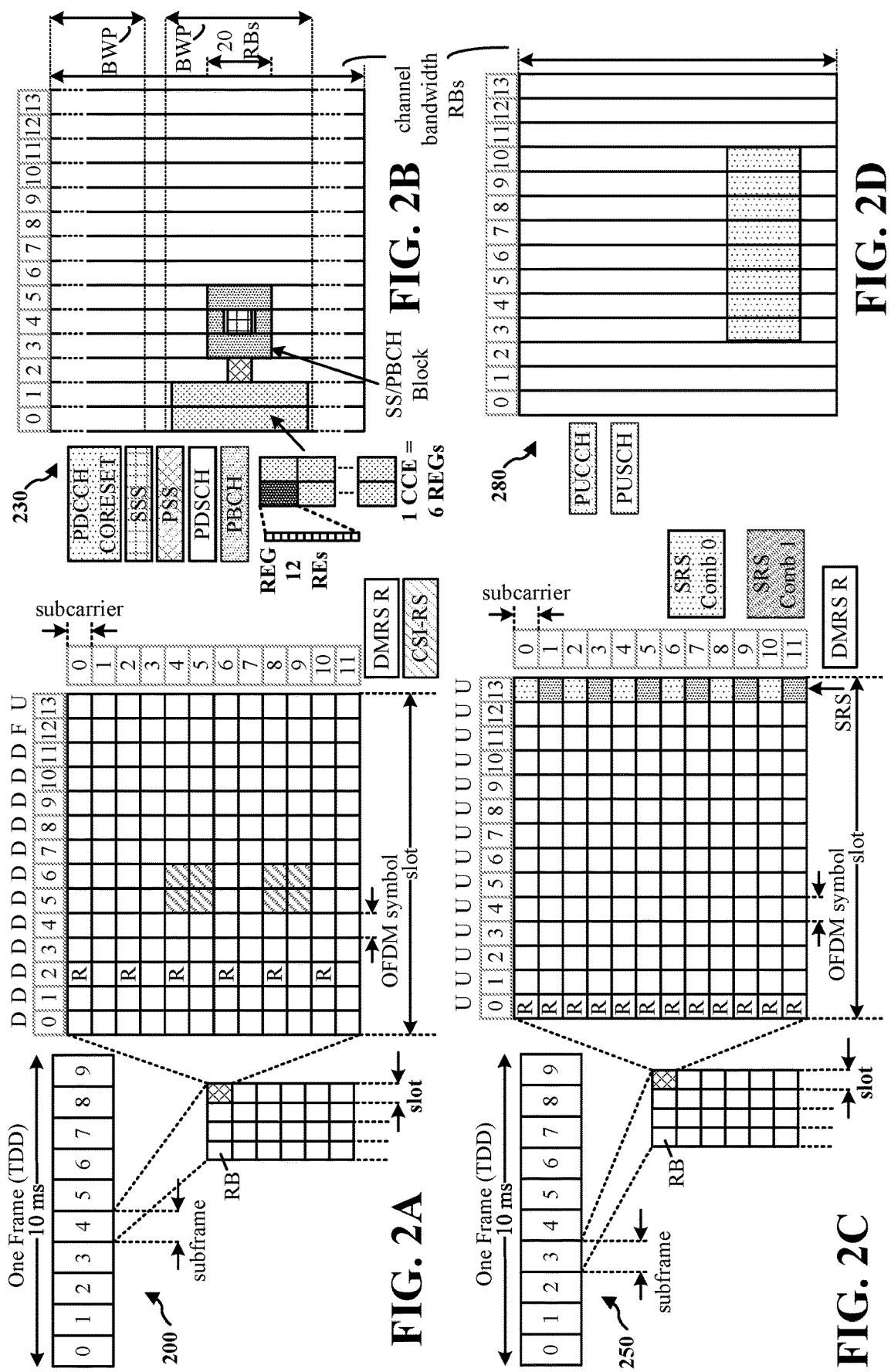
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as abase station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

Referring again to FIG. 1, in certain aspects, a first UE 104*a*, or other device communicating based on sidelink, may include an on-demand beam training component 198 configured to determine that a beam pair link (BPL) with a second UE has degraded below a threshold; generate, based on the determination that the BPL with the second UE has degraded below the threshold, a beam training frame for an on-demand beam training procedure including a first automatic gain control (AGC) symbol, sidelink control information (SCI) indicating that the beam training frame is for beam training, and one or more sets of an AGC symbol and beam sweeping reference signals (RSs); and transmit the beam training frame multiplexed with one or more data frames to the second UE. Referring again to FIG. 1, in certain aspects, a second UE 104*b*, or other device communicating based on sidelink, may include a beam training frame receiver component 199 configured to determine that a BPL with a first UE has degraded below a threshold; and receive, based on the determination that the BPL with the first UE has degraded below the threshold, a beam training frame for an on-demand beam training procedure including a first AGC symbol, SCI indicating that the beam training frame is for beam training, and one or more sets of an AGC symbol and beam sweeping RSs, the beam training frame being received with one or more data frames multiplexed with the beam training frame.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30

GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu*15$ kHz, where µ is the numerology 0 to 4. As such, the numerology µ=0 has a subcarrier spacing of 15 kHz and the numerology µ=4 has a subcarrier spacing of 240 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
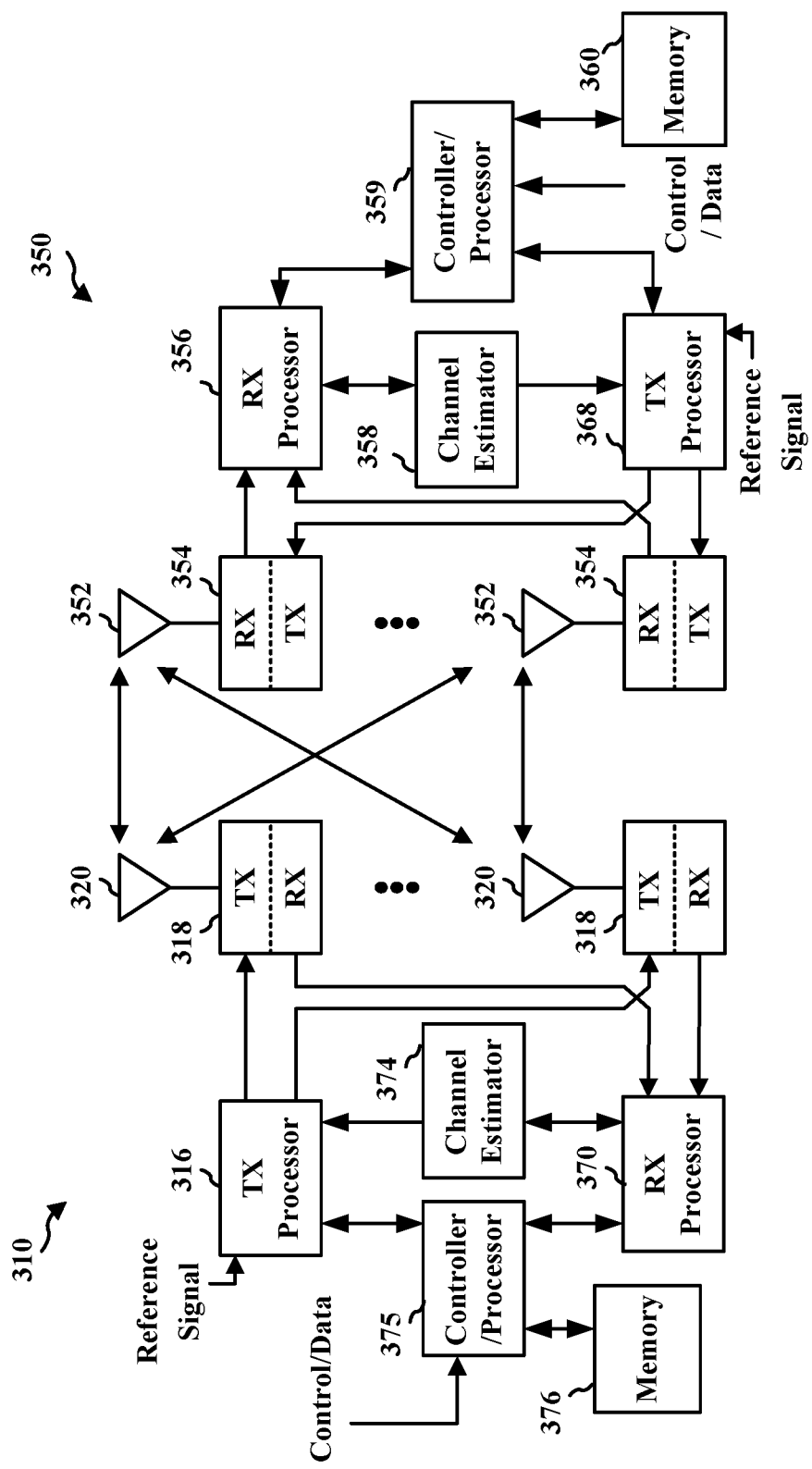
FIG. 3 is a diagram illustrating an example of a first device and a second device involved in wireless communication based, e.g., on sidelink.

FIG. 3 is a block diagram 300 of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with the on-demand beam training component 198 of FIG. 1.

At least one of the TX processor 316, the RX processor 370, and the controller/processor 375 may be configured to perform aspects in connection with the beam training frame receiver component 199 of FIG. 1.

Figure 4:
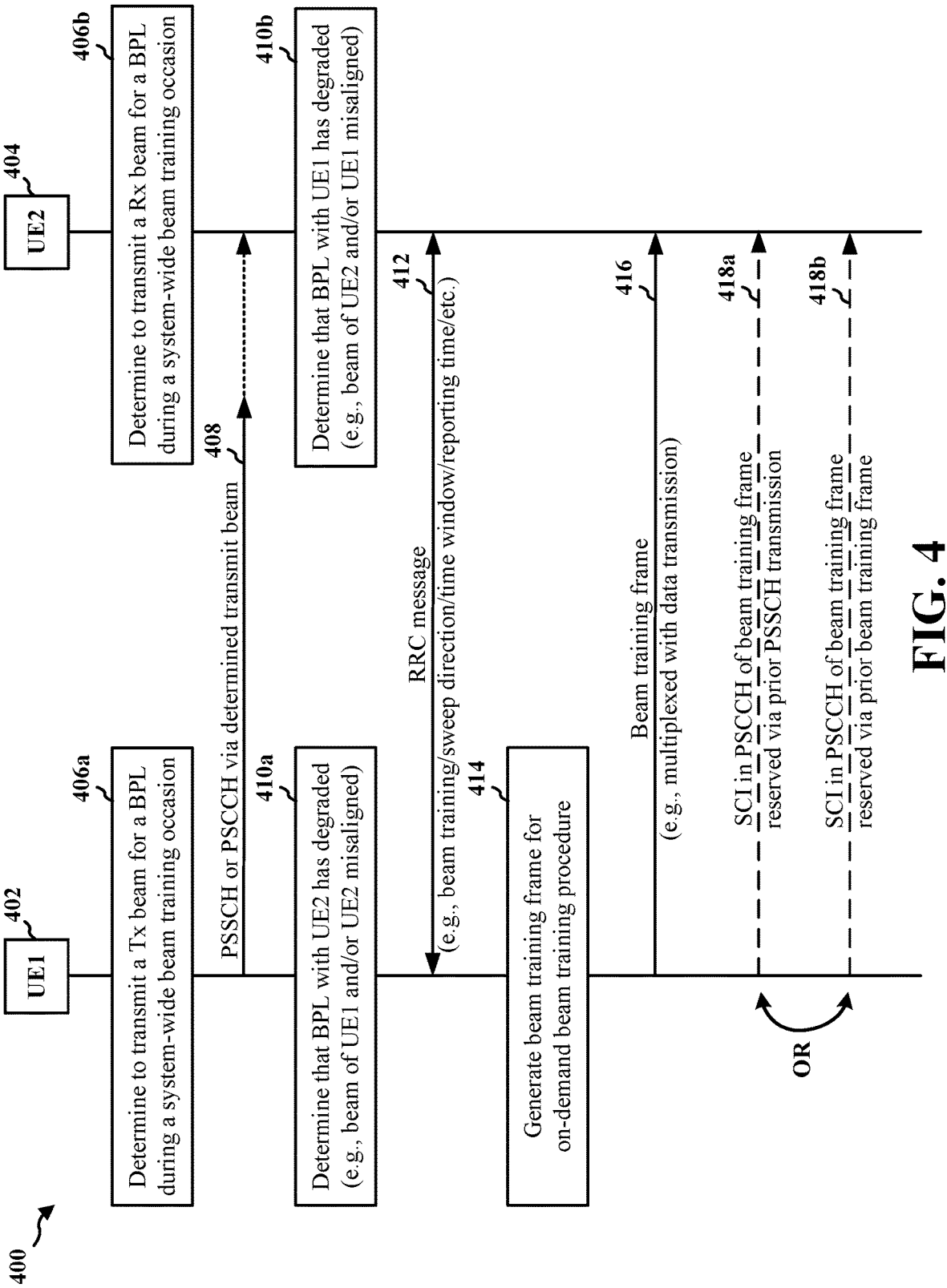
FIG. 4 is a call flow diagram illustrating communications between a first user equipment (UE) and a second UE.

FIG. 4 is a call flow diagram 400 illustrating communications between a first UE 402 and a second UE 404. At 406a, the first UE 402 (e.g., UE1) may determine to transmit a Tx beam for a BPL with the second UE 404 (e.g., UE2) during a network-wide/system-wide beam training occasion. At 406b, the second UE 404 may similarly determine to transmit a Rx beam for the BPL with the first UE 402 during a same network-wide/system-wide beam training occasion. For sidelink beam training in a distributed network, the network-wide/system-wide beam training occasions may be farther apart in time than beam training occasions associated with a Uu link. The increased time period between the beam training occasions may be provided to reduce overhead associated with establishing and maintaining millimeter wave (mmW) links in a distributed network. However, if the BPL degrades or fails, the first UE 402 and the second UE 404 may have to wait until an end of the increased time period for a next scheduled network-wide/system-wide beam training occasion before a condition of the BPL may be addressed.

At 408, the first UE 402 may transmit the determined Tx beam via a PSSCH or a PSCCH. The transmission, at 408, may or may not be received by the second UE 404. For example, if the BPL between the first UE 402 and the second UE 404 has failed, the second UE 404 may not receive the Tx beam from the first UE 402 and/or the first UE 402 may not receive the Rx beam from the second UE 404. Alternatively, the BPL between the first UE 402 and the second UE 404 may have degraded, such that the first UE 402 and the second UE 404 may still be able to communicate with each other via a degraded/weakened BPL.

At 410a, the first UE 402 may determine that the BPL with the second UE 404 has degraded (e.g., below a predefined threshold), but has not yet failed. For example, a beam of the first UE 402 (e.g., UE1) and/or a beam of the second UE 404 (e.g., UE2) may be misaligned. At 410b, the second UE 404 may similarly determine that the BPL with the first UE 402 has degraded (e.g., below the predefined threshold), but has not yet failed. For example, a beam of the second UE 404 (e.g., UE2) and/or a beam of the first UE 402 (e.g., UE1) may be misaligned. Thus, an on-demand beam training procedure may be performed to improve the BPL when the degraded condition is determined, rather than waiting until the next scheduled network-wide/system-wide beam training occasion to improve the condition of the BPL. The beam training procedure may be triggered, at 412, based on a RRC message communicated between the first UE 402 and the second UE 404. The RRC message may be indicative of a type of the beam training procedure (e.g., beam refinement, beam switching, etc.), a beam sweep direction, a time window for performing the beam training procedure, a RRC reporting time, etc.

At 414, the first UE may generate a beam training frame for performing the on-demand beam training procedure. The beam training frame may include a beam training reference signal (BTRS) that is multiplexed with one or more data transmissions. The beam training frame that is multiplexed with the one or more data transmissions may be transmitted, at 416, from the first UE 402 to the second UE 404. In a first configuration, SCI may be transmitted, at 418a, to the second UE 404 in a PSCCH of the beam training frame via a reservation indicated by a prior PSSCH transmission. In a second configuration, SCI may be transmitted, at 418b, to the second UE 404 in a PSCCH of the beam training frame via a reservation indicated by a prior beam training frame. Upon performing the on-demand beam training procedure based on the beam training frame that multiplexes the BTRS with the one or more data transmissions, a quality of the BPL between the first UE 402 and the second UE 404 may be improved prior to the next network-wide/system-wide beam training occasion.

Figure 5:
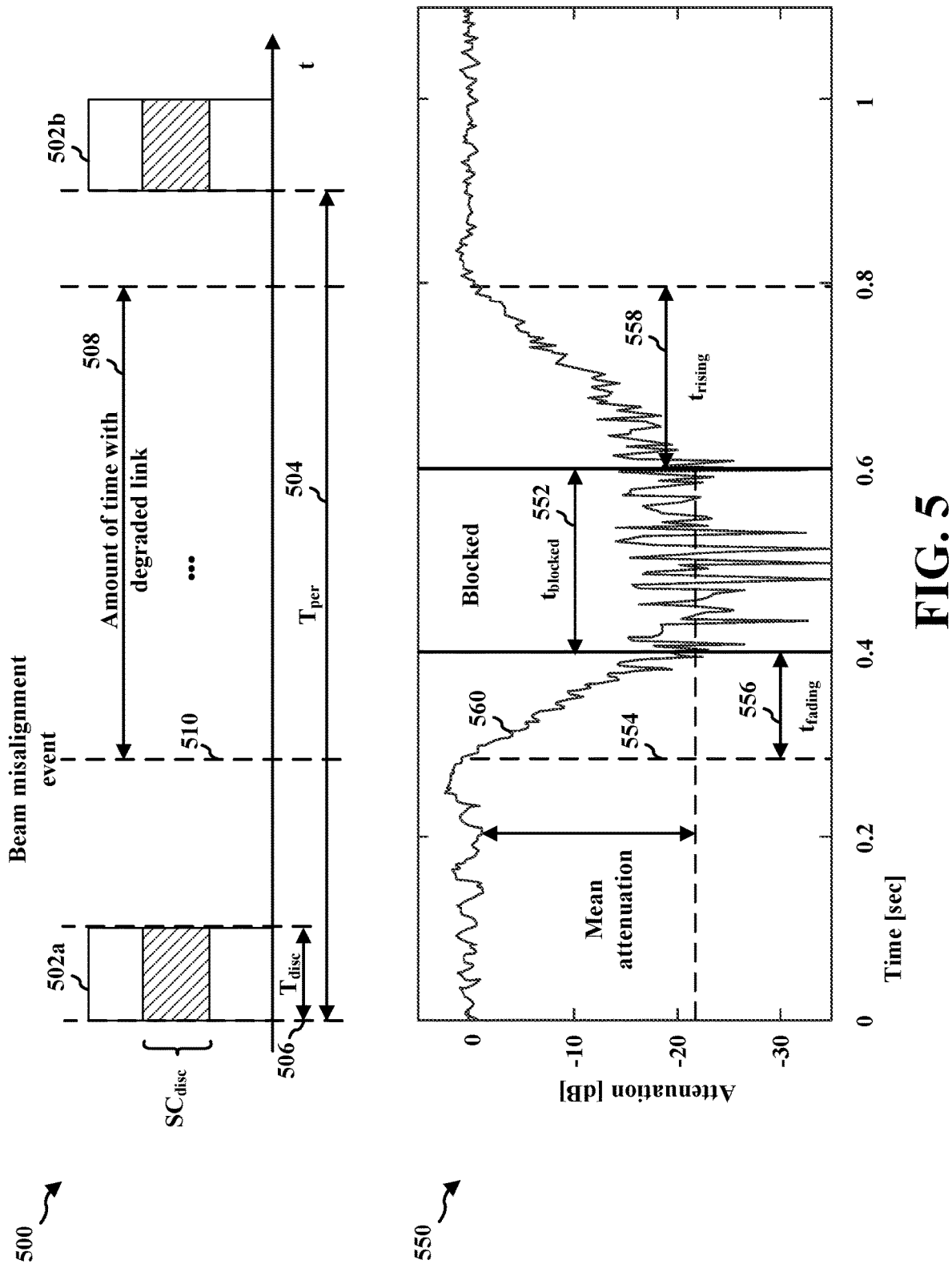
FIG. 5 illustrates a diagram of separate beam training occasions and a corresponding graph indicative of an attenuation of a beam pair link (BPL) between the separate beam training occasions.

FIG. 5 illustrates a diagram 500 of separate beam training occasions 502a-502b and a corresponding graph 550 indicative of an attenuation 560 of a BPL between the separate beam training occasions 502a-502b. A mmW communication in frequency range 2 (FR2) may correspond to frequencies of 24.25 GZ to 52.6 GHz. Communications transmitted in FR2 may be beamformed based on a path loss that may occur for such transmissions. That is, high-frequency waves associated with FR2 may degrade more rapidly with distance than lower frequency waves (e.g., frequency range 1 (FR1) waves corresponding to frequencies of 410 MHz to 7,125 MHz). Beamforming operations performed for sidelink communications, such as V2X, D2D, etc., may have increased complexity in comparison to beamforming operations performed between a base station and a UE, as each UE of a distributed network may have to establish a BPL with a peer UE to perform point-to-point (e.g., unicast) communications. In distributed networks, a central entity such as a base station, a RSU, an AP, etc., may not be used to coordinate sidelink communications. Thus, establishing and maintaining mmW links in distributed networks may be associated with higher overhead than establishing and maintaining links in FR1 and/or establishing and maintaining mmW links where resources are scheduled by a central entity.

For sidelink communication over FR2 in distributed networks, resources of network-wide/system-wide periodic beam training occasions 502a-502b may be semi-statically configured for beam search and beam training procedures. The beam training occasions 502a-502b may be associated with an increased time period ($T_{per}$) 504 for a plurality of nodes in the distributed network to create and maintain links with each other. The increased time period 504 for the beam training occasions 502a-502b may provide reduce system overhead. For example, a 100 ms beam training occasion 502a-502b may be configured every 1,000 ms to provide a 10 percent overhead. Each of the network-wide/system-wide periodic beam training occasions 502a-502b may be 10s or 100s of milliseconds to allow distributed nodes in the network to create and maintain links (e.g., via beam searching, RACH procedures, etc.) in the semi-statically configured resources. Since such beam training occasions 502a-502b may be associated with the increased time period 504, beam training resources may occur less frequently than beam training resources associated with a shorter time period. For instance, unlike Uu links where resources may be synchronized every 20 ms (e.g., based on 5 ms beam training resources), 100 ms beam training resources may be associated with longer beam training occasions 502a-502b. Since mmW links may change in time (e.g., on the order of 10s or 100s of ms), a mechanism may be needed to perform a beam training procedure between the beam training occasions 502a-502b separated based on the increased time period 504.

A discovery period ($T_{disc}$) 506 (e.g., including subcarrier discovery ($SC_{disc}$)) for a beam training occasion 502a may occur based on a periodicity (e.g., time period 504). In some cases, the network-wide/system-wide beam training occasions 502a-502b may be far apart in time. For example, the discovery period 506 may be 100 ms and may correspond to a periodicity/time period 504 of 1,000 ms (e.g., 1 second). Beam misalignment may occur, at 554, between the beam training occasions 502a-502b based on a mmW links becoming diffracted or blocked (e.g., at 552). The beam misalignment, at 554, may occur shortly after the beam discovery period 506. Thus, to recover the misaligned beam via the resources of the network-wide/system-wide beam training occasions 502a-502b, the UEs may have to wait for a next network-wide/system-wide beam training occasion (e.g., 502b). Accordingly, an amount of time over which the UE may have to use a poor/degraded BPL may include a prolonged period 508 between the beam training occasions 502a-502b.

The graph 550 indicates measurement results associated with the prolonged period 508 of the poor/degraded BPL. The prolonged period 508 may include a fading time ($t_{fading}$) 556, a blocked time ($t_{blocked}$) 552, and a rising time ($t_{rising}$) 558 associated with an attenuation 560 of the BPL. In the illustrated example, the mmW link may become blocked, at 552, approximately 300 ms after the discovery period 506 concludes and remain in a blocked condition for 200 ms before the blocking event ends and the BPL may again be utilized by the UEs (e.g., during and after the rising time 558). During the 200 ms blocked time 552, the UEs may not be able to communicate with each other via sidelink. Thus, if a beam misalignment event 510 occurs approximately 300 ms after a 100 ms discovery period 506, the UEs may have to use degraded beams for the next 700 ms based on the periodicity/time period 504 being equal to 1,000 ms. For Uu links, a beam misalignment event 510 may be detected based on CSI-RS that is transmitted and acknowledged by a base station. However, in sidelink there may not be available mechanisms for improving the degraded BPL until a next periodic beam training occasion (e.g., 502*b*). As such, the UEs may have a channel that is unusable during the blocked time 552, which may occur multiple times between the beam training occasions 502*a*-502*b*.

The beam misalignment event 510 that occurs between the beam training occasions 502*a*-502*b* may be addressed based on a mechanism for providing "on-demand" beam alignment. That is, the mechanism may be configured to align and/or search for beams during slots of a data period that follows the beam training occasion 502*a* (e.g., via resources not initially reserved for beam training). In aspects, a beam training procedure may be multiplexed with feedback resources based on slots of the data period located between the beam training occasions 502*a*-502*b* and/or based on one or more slots configured to multiplex a BTRS with a data transmission.

Beam alignment over data slots for FR2 may be performed for a mode 2 sidelink unicast connection. Mode 2 may correspond to a fully distributed network that does not rely on a central entity such as a base station or an AP to coordinate transmissions. For FR2 communications in sidelink, UE performance may be increased by configuring the UE to perform beam alignment/beam refinement procedures during a link blockage that occurs between the network-wide/system-wide beam training occasions 502*a*-502*b*. Beam training procedures may be used to refine an initial BPL or switch to a secondary beam when a primary beam degrades below a threshold. Performing beam training procedures between the network-wide/system-wide beam training occasions 502*a*-502*b* may decrease a time period (e.g., 508) for which the UE utilizes a degraded beam or suffers from a radio link failure (RLF).

Figure 6:
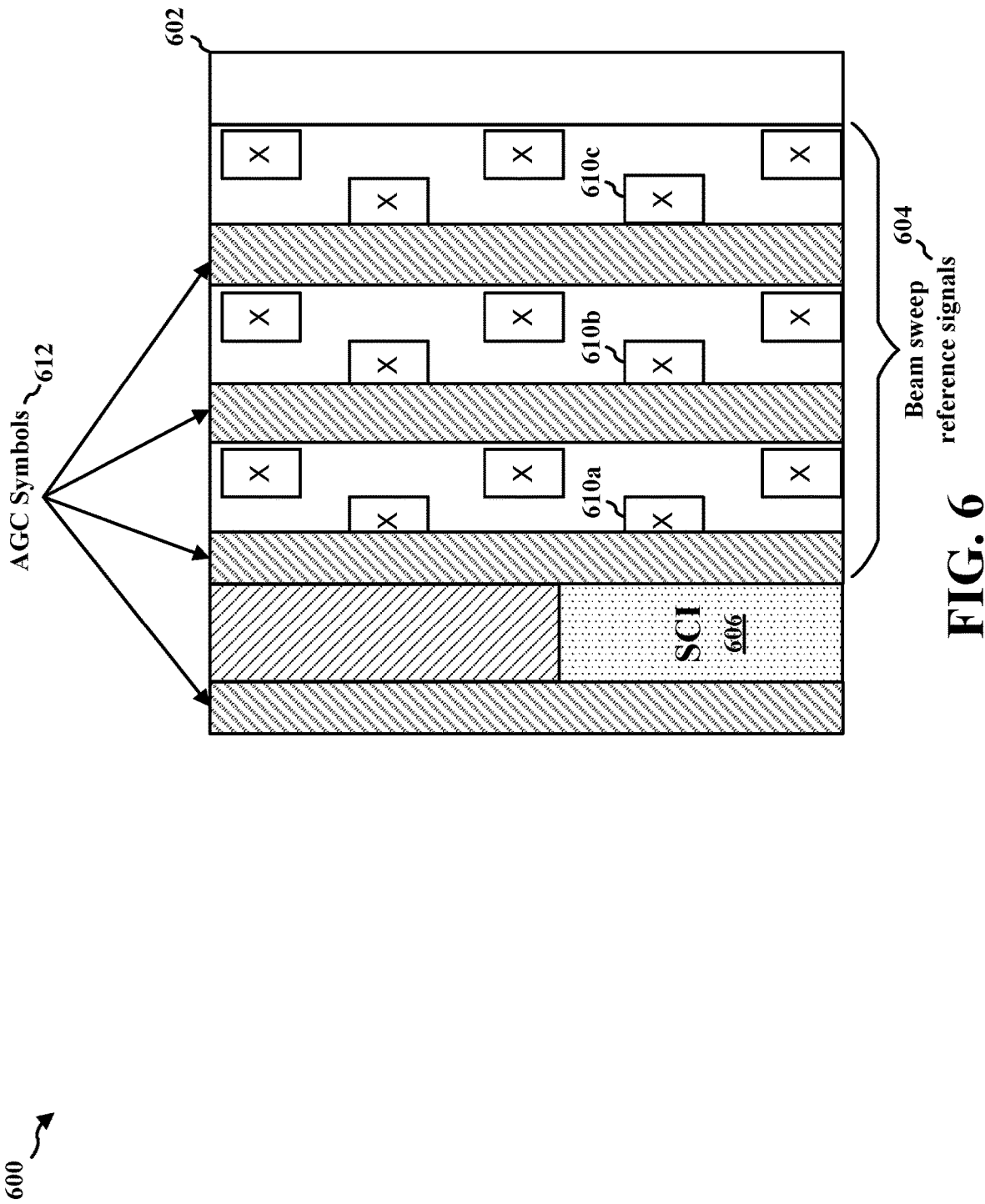
FIG. 6 illustrates a diagram of a subframe for performing a beam training procedure between network-wide/system-wide beam training occasions.

FIG. 6 illustrates a diagram 600 of a subframe 602 for performing a beam training procedure between network-wide/system-wide beam training occasions. The subframe 602 may be used for sidelink beam training procedures in FR2. A slot associated with the subframe 602 may include a plurality of beam sweep reference signals 604 (e.g., BTRSs) corresponding to different beam directions or a same beam direction based on whether a peer UE is performing a Tx beam sweep or a Rx beam sweep. SCI 606 may be transmitted via a same beam that was used to perform a preceding PSSCH or PSCCH transmission. That is, the SCI 606 may be transmitted via the established BPL that has degraded. The SCI 606 may be transmitted when the UE determines that a quality of the BPL has degraded below a threshold and prior to the BPL becoming completely blocked or a RLF occurring. Based on N measurements performed by the UE, a trend of the measurements may indicate that the BPL is degrading and that the subframe 602 may be utilized to perform a beam training procedure.

The SCI 606 may indicate whether a slot is to be used for data 610*a*/610*b*/610*c* and/or the beam sweep reference signals 604. For example, first stage SCI (SCI-1) may include a bit indicative of the data 610*a*-610*b* or the beam sweep reference signals 604. The bit may be set to 1 to indicate that the slot is configured based on the subframe 602 for performing a beam training procedure. The bit may be set to 0 to indicate that the slot is a standard PSSCH slot. An absence of the bit from the SCI-1 may also indicate that the slot is the standard PSSCH slot. The SCI-1 may further indicate transmission configuration indicator (TCI) states and quasi co-location (QCL) assumptions on each beam sweep reference signals 604. The QCL assumptions may be determined in association with a beam over which the SCI-1 is transmitted. A beam refinement procedure may correspond to all of the beam sweep reference signals 604 being QCLed with an initial beam, whereas the beam sweep reference signals 604 may not be QCLed for a beam switch procedure.

The subframe 602 may be include AGC symbols 612, data symbols, and beam training symbols. The SCI-1 may indicate the presence of data 610*a*-610*b* in the slot associated with the subframe 602. The data 610*a*-610*c* may be transmitted over an existing BPL (e.g., QCLed with the SCI-1). For example, data 610*a*-610*c* may be transmitted over one or more symbols associated with the subframe 602 and the beam training procedure may be performed over one or more further symbols associated with the subframe 602. The data symbols and the beam training symbols may be partitioned in any manner within the slot. For example, a first half of the slot may be partitioned for the data 610*a*-610*c* and a second half of the slot may be partitioned for the beam training procedure.

Figure 7:
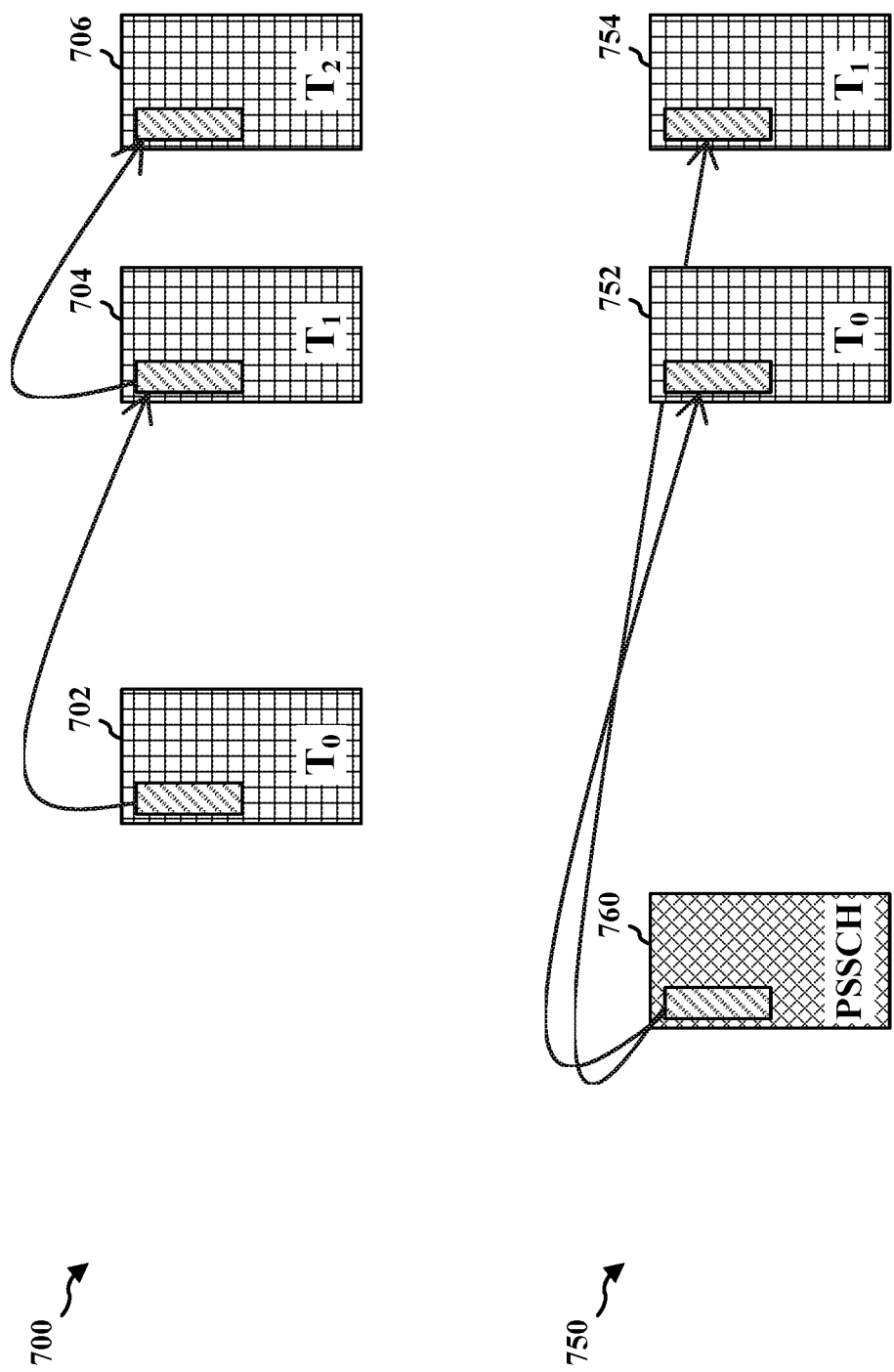
FIG. 7 illustrates diagrams for reserving one or more beam training slots based on the subframe.

FIG. 7 illustrates diagrams 700-750 for reserving one or more beam training slots based on the subframe 602. The reservation may be performed on-demand in any data slot between the network-wide/system-wide beam training occasions 502*a*-502*b*. Thus, a preconfigured data slot may not be needed to utilize the subframe 602, as the subframe 602 may be indicated based on other mechanisms. When the UE determines to perform a beam training procedure, one slot (e.g., $T_0$ 702/752) may not be long enough to complete the beam training procedure. For example, if 16 distinct or non-distinct beams are to be scanned for performing the beam training procedure but only 4 beam training symbols fit within slot $T_0$ 702/752, 4 slots may be needed to perform the beam training procedure. Each slot that includes the beam training symbols may be used to reserve one or more future slots for performing the beam training procedure. For example, SCI of slot $T_0$ 702 may be used to reserve slot $T_1$ 704 and SCI of slot $T_1$ 704 may be used to reserve slot $T_2$ 706. Thus, in addition to indicating how to decode or process the slots, the SCI may include reservation information for reserving the one or more future slots (e.g., slot $T_1$ 704 and slot $T_2$ 706) used to perform the beam training procedure. A peer UE may receive the SCI via the initial BPL.

In some configurations, a first beam training slot $T_0$ 752 may be reserved by SCI transmitted in a preceding PSCCH channel accompanying a PSSCH slot 760. That is, a previously transmitted SCI associated with the PSSCH message may reserve the one or more future slots for performing the beam training procedure. For example, the UE may determine prior to transmitting the PSSCH message that a beam training procedure is to be performed and may reserve beam training resources (e.g., in slot $T_0$ 752) for performing the beam training procedure. Such resources may be further used to reserve one or more subsequent beam training resources (e.g., based on the techniques illustrated in diagram 700). In some cases, other UEs may perform similar techniques to exclude the first slot $T_0$ 752. In other cases, the SCI associated with the PSSCH slot 760 may reserve multiple slots (e.g., slot $T_0$ 752 and slot $T_1$ 754) for performing the beam training procedure. The SCI may be transmitted over the same beam for both the PSSCH slot 760 and the beam training slots 752-754. Reservation information include in the SCI may indicate time-frequency resources for performing the beam training procedure. Additionally, the reservation information may include the TCI-states and the QCL assumptions of the BTRS. For example, TCI-states may be indicated for the beams to be used at the one or more future slots (e.g., slot $T_1$ 704/754, slot $T_2$ 706, etc.) and the QCL assumptions of the beams to be used at time $T_0$ 702 for the PSSCH slot 760.

Figure 8:
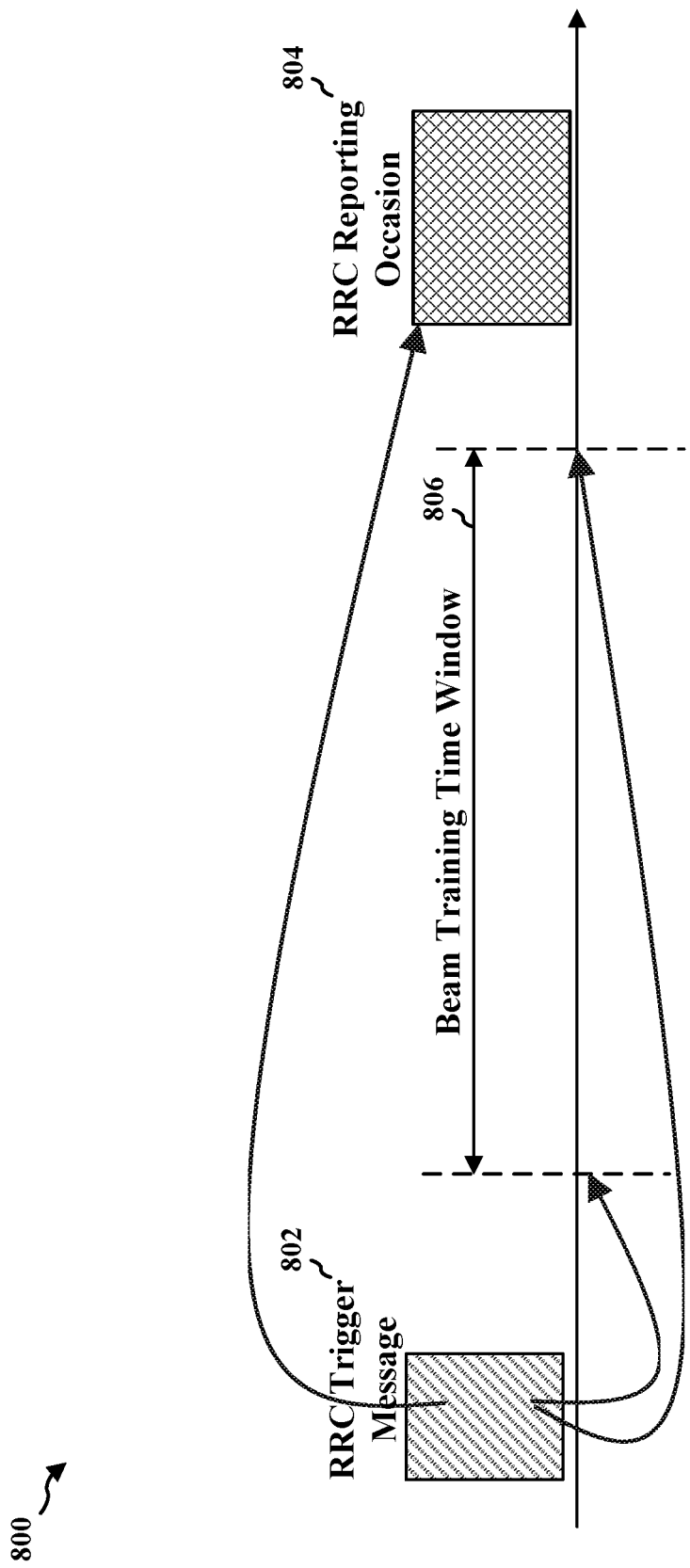
FIG. 8 illustrates a diagram corresponding to a radio resource control (RRC) trigger message and a RRC reporting occasion.

FIG. 8 illustrates a diagram 800 corresponding to a RRC trigger message 802 and a RRC reporting occasion 804. In some configurations, the beam training procedure may be triggered by the RRC trigger message 802 from a peer UE. The RRC trigger message 802 may be transmitted on the established BPL based on a measurement of the UE or a measurement report of the peer UE. For example, a Rx device such as the peer UE may perform the measurement based on a reference signal (e.g., DMRS) and transmit the measurement report to a Tx device such as the UE. Based on the measurements that the UE performs or receives from the peer UE via the RRC trigger message 802, the UE may determine to perform the beam training procedure. The RRC trigger message 802 may indicate whether the beam training procedure is for a beam refinement or a beam search. Beam refinement may be performed when the BPL may be improved but may continue to be used, whereas the beam search may be performed when the BPL is to be abandoned in favor of a different BPL.

The RRC trigger message 802 may further indicate a beam training time window 806 for performing the beam training procedure. After the UE determines to perform the beam refinement/beam search, the UE may transmit the RRC trigger message 802 indicative of the beam training time window 806 over which the beam training procedure may be performed. A peer UE may negotiate with the UE a start time and an end time of the beam training time window 806 for the on-demand beam training procedure. The RRC trigger message 802 may indicate whether to perform a Tx beam sweep, a Rx beam sweep, or both. If the RRC trigger message 802 is initiated by a BTRS transmission, the transmission may indicate the TCI-states of the beams to the receiver. If the RRC trigger message 802 is initiated by a BTRS reception, the received signal may indicate the TCI state of the beams for which the transmitter is to perform a listening procedure.

The RRC trigger message 802 may further indicate a time period after the beam training procedure is performed for an RRC reporting occasion 804. During the RRC reporting occasion 804, a beam training report may be transmitted to the UE based on a measurement of the peer UE. The RRC trigger message 802 may indicate when the BTRS transmitter may be listening for the beam training report from the peer UE. In aspects, the beam training report may be transmitted by whichever UE receives the BTRS. The BTRS receiver may determine the resources in the RRC reporting occasion 804 for transmitting the beam training report.

Beam training reporting techniques of the UEs may be enabled or disabled. If reporting is enabled, the BTRS receiver may indicate the TCI-state or index of a selected beam in the beam training report. The BTRS receiver may alternatively indicate that no beam was selected for the BPL. The lack of a selected beam in the beam training report may be indicative of a RLF. In other cases, beam training reporting may be disabled when a Rx beam sweep is to be performed. If the UEs negotiate that the receiver is to change the Rx beams but the transmitter is to maintain the Tx beams, transmitting a beam training report to the transmitter may be an unnecessary procedure. Thus, beam training reporting procedures may be enabled or disabled by the UEs.

Since the subframe 602 may be used for multiplexing one or more data transmissions, resource exclusion and/or coexistence procedures may be performed to decrease data transmission degradations. That is, transmissions associated with the beam training procedure based on the subframe 602 may cause a degradation to data transmitted by other UEs of the network. As beams are being swept, different symbols within a slot may correspond to different Rx powers. Thus, in some cases the different Rx powers received over the different symbols of the slot may cause an AGC assumption of the receiver to be incorrect.

Beams that are being swept may be assumed to be angularly close at the receiver, which may be determined based on the QCL assumption in the SCI. Other UEs of the network may exclude frequency resources over which the beam training procedure is performed but may transmit signals in other subchannels in the same TTI or same slot. In another cases, the beams that are being swept may not be assumed to be angularly close, which may similarly be determined based on the QCL assumption in the SCI. The UEs that receive the SCI but do not intend to perform the beam training procedure may exclude the entire TTI, if the transmission is directed toward the UEs. If a UE receives a reservation that may not coexist with the indicated beam training frames, the UE may use the PSFCH channel to trigger a reevaluation of the resources. For example, the UE may use the feedback channel to trigger the other UE to perform a pre-collision or post-collision procedure for avoiding a particular slot. Such techniques may be advantageous when the transmitter does not receive the SCI for the BTRS slots but one of the intended receivers does received the SCI for the BTRS slots.

Figure 9:
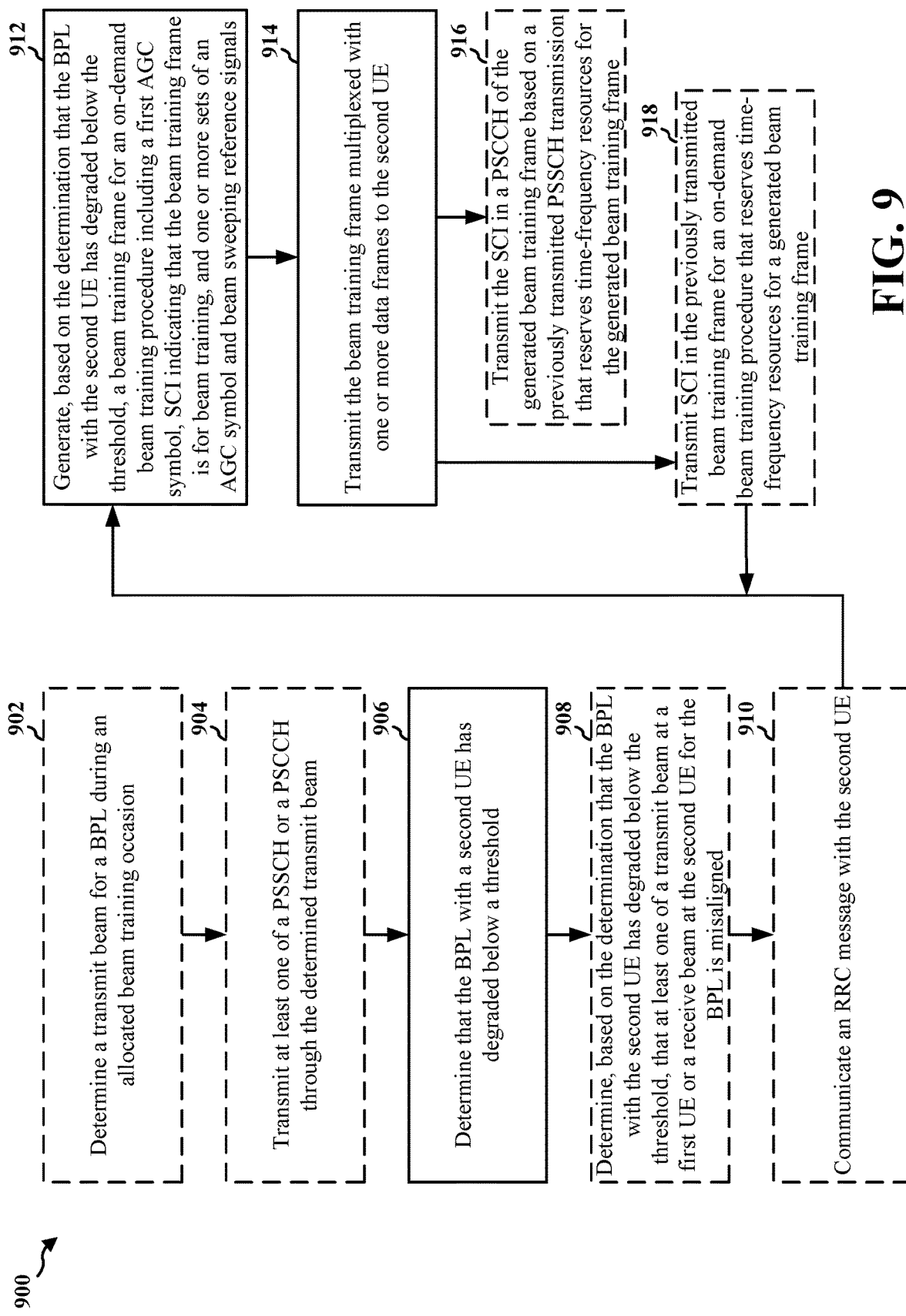
FIG. 9 is a flowchart of a method of wireless communication of a first UE.

FIG. 9 is a flowchart 900 of a method of wireless communication. The method may be performed by a UE (e.g., the first UE 104a/402; the apparatus 1102; etc.), which may include the memory 360 and which may be the entire first UE 104a/402 or a component of the first UE 104a/402, such as the TX processor 368, the RX processor 356, and/or the controller/processor 359.

At 902, the UE may determine a transmit beam for a BPL during an allocated beam training occasion. For example, referring to FIGS. 4-6, the first UE 402 may determine, at 406a, to transmit a Tx beam for the BPL during a system-wide beam training occasion 502a-502b. The determination, at 406a, by the first UE 402 may precede a determination, at 410a, that the BPL with the second UE 404 has degraded below a threshold. As such, SCI 606 may be transmitted in a beam training frame (e.g., subframe 602) with the determined Tx beam. The SCI in the beam training frame (e.g., subframe 602) may further indicate at least one of a TCI state ID indicating a QCL assumption with respect to the determined transmit beam for the BPL for each set of the AGC symbols 612 and beam sweep reference signals 604 of one or more sets of the AGC symbols 612 and the beam sweep reference signals 604.

At 904, the UE may transmit at least one of a PSSCH or a PSCCH through the determined transmit beam. For example, referring to FIGS. 4 and 6, the first UE 402 may transmit, at 408, a PSSCH or a PSCCH via the Tx beam determined, at 406a. The transmission, at 408, by the first UE 402 may precede the determination, at 410a, that the BPL with the second UE 404 has degraded below the threshold. As such, SCI 606 may be transmitted in a beam training frame (e.g., subframe 602) with the Tx beam.

At 906, the UE may determine that the BPL with a second UE has degraded below a threshold. For example, referring to FIGS. 4-6, the first UE 402 may determine, at 410a, that the BPL with the second UE 404 has degraded. For instance, the first UE 402 may determine that the beam misalignment, at 554, has occurred, which may correspond to the beam misalignment event 510. The determination, at 410a, that the BPL with the second UE 404 has degraded below the threshold may occur at a time between two system-wide allocated beam training occasions 502a-502b. The BPL with the second UE 404 may be determined, at 410a, to have degraded below the threshold when a received power measured at the second UE 404 over a reference signal of the beam sweep reference signals 604 has degraded below the threshold.

At 908, the UE may determine, based on the determination that the BPL with the second UE has degraded below the threshold, that at least one of a transmit beam at a first UE or a receive beam at the second UE for the BPL is misaligned. For example, referring to FIGS. 4 and 5, the first UE 402 may determine, at 410a, that the BPL with the second UE 404 has degraded based on a beam of the first UE 402 and/or the second UE 404 being misaligned. For instance, the beam misalignment, at 554, may occur, which may correspond to the beam misalignment event 510. Each set of the AGC symbols 612 and the beam sweep reference signals 604 corresponds to a same transmit beam direction when the transmit beam at the first UE for the BPL is determined to be aligned and the receive beam at the second UE for the BPL is determined to be misaligned. Each set of the AGC symbols 612 and the beam sweep reference signals 604 may correspond to a different transmit beam direction when the transmit beam at the first UE 402 for the BPL is determined, at 410a, to be misaligned.

At 910, the UE may communicate an RRC message with the second UE. For example, referring to FIGS. 4 and 8, the first UE 402 may communicate, at 412 a RRC message to the second UE 404 based on the determination, at 410a, that the BPL with the second UE 404 has degraded below the threshold. The RRC messages (e.g., RRC trigger message 802) may include at least one of information indicating whether the on-demand beam training procedure is for beam refinement or a beam search; a time window (e.g., beam training time window 806) for the on-demand beam training procedure; whether the on-demand training procedure is for a transmit beam sweep, a receive beam sweep, or both a transmit beam sweep and a receive beam sweep; or information indicating reporting occasions (e.g., RRC reporting occasion 804) for receiving a measurement report associated with the on-demand training procedure.

At 912, the UE may generate, based on the determination that the BPL with the second UE has degraded below the threshold, a beam training frame for an on-demand beam training procedure including a first AGC symbol, SCI indicating that the beam training frame is for beam training, and one or more sets of an AGC symbol and beam sweeping reference signals. For example, referring to FIGS. 4 and 6, the first UE 402 may generate, at 414, a beam training frame (e.g., subframe 602) for an on-demand beam training procedure based on the determination, at 410a. The beam training frame/subframe 602 may include the AGC symbols 612 and the beam sweep reference signals 604. The one or more sets of the AGC symbols 612 and the beam sweep reference signals 604 may include a plurality of sets of the AGC symbols 612 and the beam sweep reference signals 604. The beam training frame (e.g., subframe 602) may be further generated to include data 610a-610c, and the SCI 606 may indicate that the beam training frame (e.g., subframe 602) includes the data 610a-610c. The SCI 606 in the beam training frame (e.g., subframe 602) may reserve future time-frequency resources for a subsequent beam training frame for the on-demand beam training procedure.

At 914, the UE may transmit the beam training frame multiplexed with one or more data frames to the second UE. For example, referring to FIGS. 4 and 6, the first UE 402 may transmit, at 416, the beam training frame (e.g., subframe 602 multiplexed with the data 610a-610c) to the second UE 404.

At 916, the UE may transmit the SCI in a PSCCH of the generated beam training frame based on a previously transmitted PSSCH transmission that reserves time-frequency resources for the generated beam training frame. For example, referring to FIGS. 4 and 7, the first UE 402 may transmit, at 418a, SCI in a PSCCH of the beam training frame, which may have been reserved via a prior PSSCH transmission. For instance, slot $T_0$ 752 and slot $T_1$ 754 may be reserved based on SCI of a preceding PSCCH channel accompanying the PSSCH slot 760.

At 918, the UE may transmit SCI in the previously transmitted beam training frame for an on-demand beam training procedure that reserves time-frequency resources for a generated beam training frame. For example, referring to FIGS. 4 and 7, the first UE 402 may transmit, at 418b, SCI in a PSCCH of the beam training frame, which may have been reserved via a prior beam training frame. Thus, in some configurations, 918 may precede 912, such as when the previously transmitted beam training frame corresponds to slot $T_0$ 702 and the generated beam training frame corresponds to slot $T_1$ 704, where the SCI of slot $T_0$ 702 may reserve time-frequency resources in slot $T_1$ 704. In other configurations, 918 may occur after 912, such as when the previously transmitted beam training frame corresponds to the generated beam training frame of slot $T_1$ 704, and slot $T_2$ 706 is based on a next generated beam training frame. That is, the SCI of slot $T_1$ 704 may reserve time-frequency resources in slot $T_2$ 706.

Figure 10:
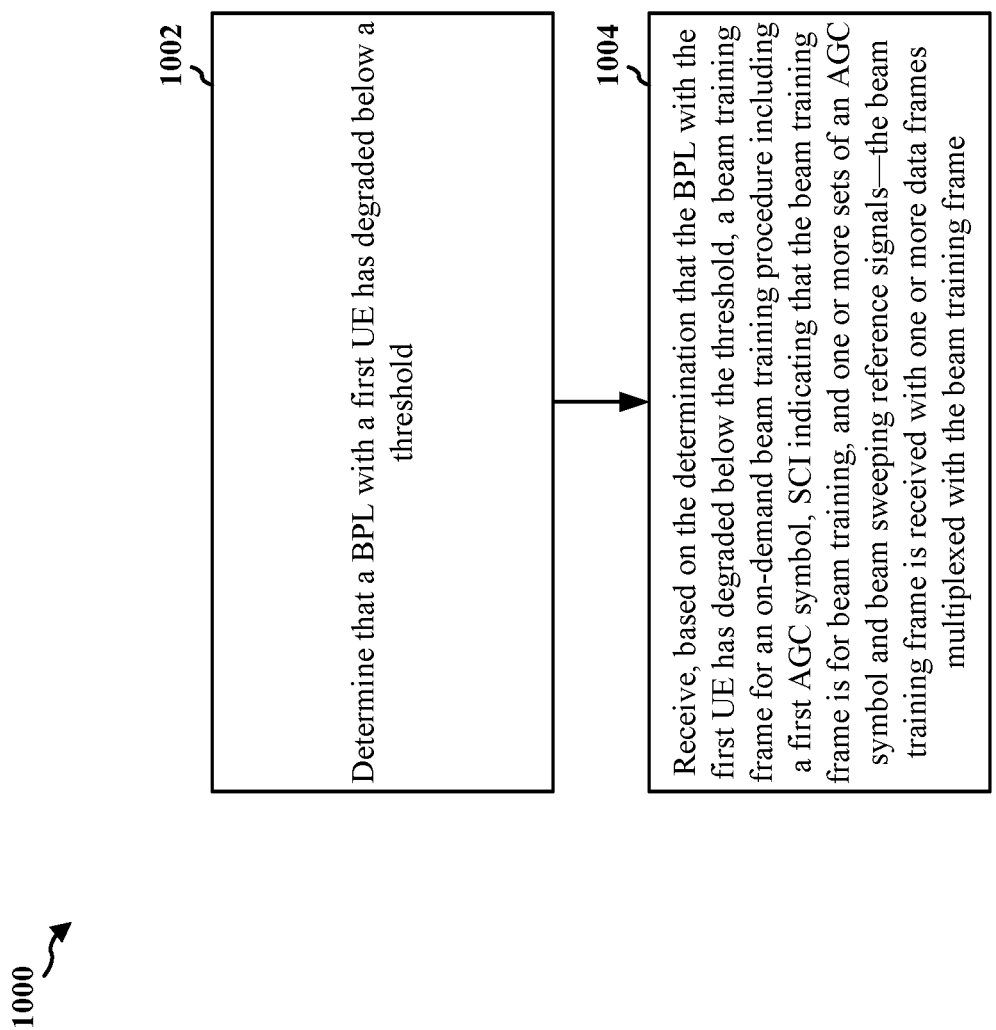
FIG. 10 is a flowchart of a method of wireless communication of a second UE.

FIG. 10 is a flowchart 1000 of a method of wireless communication. The method may be performed by a UE (e.g., the second UE 104b/404; the apparatus 1202; etc.), which may include the memory 376 and which may be the entire second UE 104b/404 or a component of the second UE 104b/404, such as the TX processor 316, the RX processor 370, and/or the controller/processor 375.

At 1002, the UE may determine that a BPL with a first UE has degraded below a threshold. For example, referring to FIGS. 4-5, the second UE 404 may determine, at 410b, that the BPL with the first UE 402 has degraded. For instance, the second UE 404 may determine that the beam misalignment, at 554, has occurred, which may correspond to the beam misalignment event 510.

At 1004, the UE may receive, based on the determination that the BPL with the first UE has degraded below the threshold, a beam training frame for an on-demand beam training procedure including a first AGC symbol, SCI indicating that the beam training frame is for beam training, and one or more sets of an AGC symbol and beam sweeping reference signals—the beam training frame is received with one or more data frames multiplexed with the beam training frame. For example, referring to FIGS. 4 and 6, the second UE 404 may receive, at 416, the beam training frame (e.g., subframe 602 multiplexed with the data 610a-610c) from the first UE 402 based on the determination, at 410b. The beam training frame/subframe 602 for the beam training procedure may include the AGC symbols 612 and the beam sweep reference signals 604.

Figure 11:
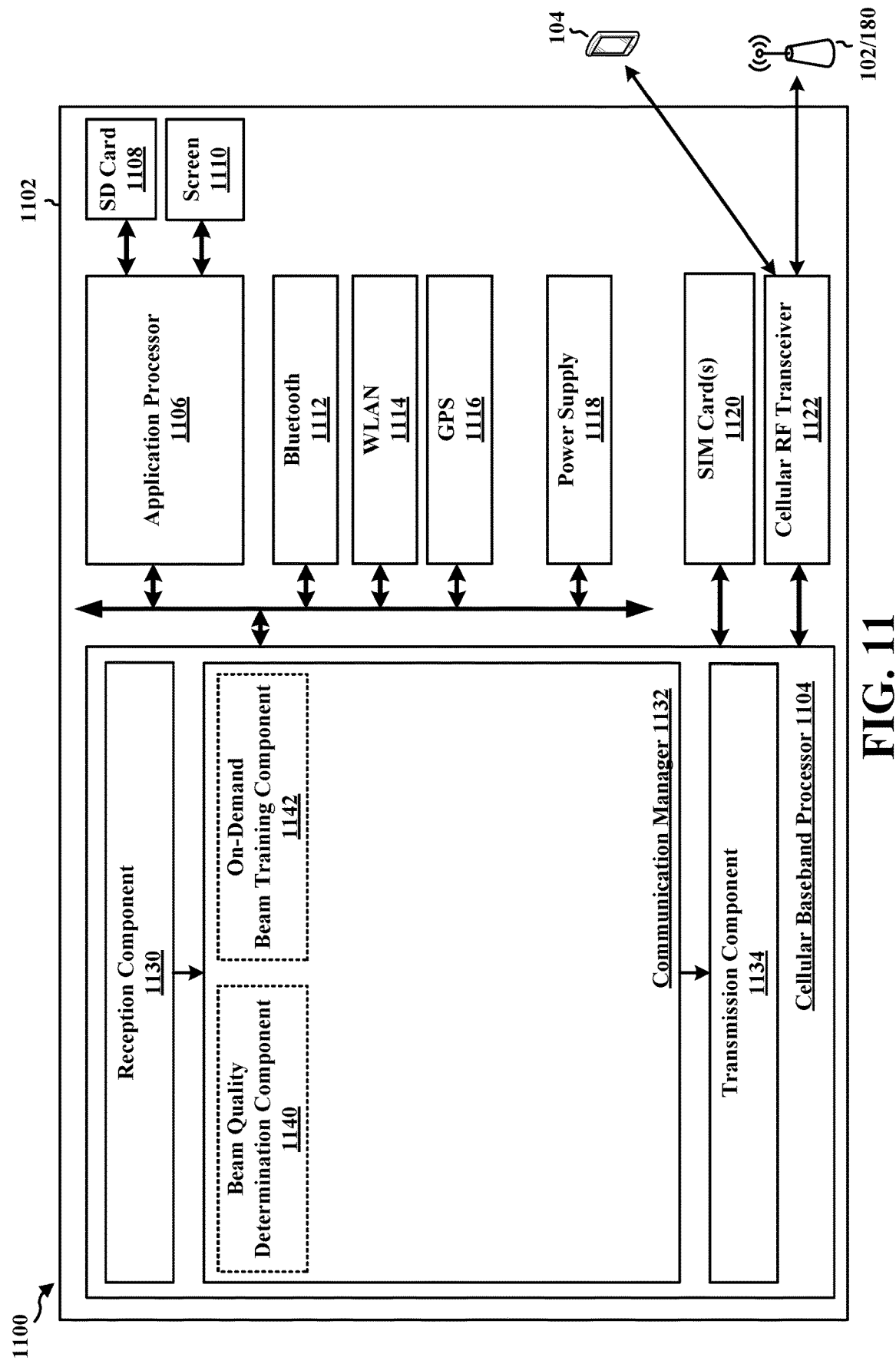
FIG. 11 is a diagram illustrating an example of a hardware implementation for an example apparatus.

FIG. 11 is a diagram 1100 illustrating an example of a hardware implementation for an apparatus 1102. The apparatus 1102 is a UE and includes a cellular baseband processor 1104 (also referred to as a modem) coupled to a cellular RF transceiver 1122 and one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the aforediscussed additional modules of the apparatus 1102.

The communication manager 1132 includes a beam quality determination component 1140 that is configured, e.g., as described in connection with 902-910, to determine a transmit beam for a BPL during an allocated beam training occasion; to transmit at least one of a PSSCH or a PSCCH through the determined transmit beam; to determine that the BPL with a second UE has degraded below a threshold; to determine, based on the determination that the BPL with the second UE has degraded below the threshold, that at least one of a transmit beam at a first UE or a receive beam at the second UE for the BPL is misaligned; and to communicate an RRC message with the second UE. The communication manager 1132 further includes an on-demand beam training component 1142 that is configured, e.g., as described in connection with 912-918, to generate, based on the determination that the BPL with the second UE has degraded below the threshold, a beam training frame for an on-demand beam training procedure including a first AGC symbol, SCI indicating that the beam training frame is for beam training, and one or more sets of an AGC symbol and beam sweeping reference signals; to transmit the beam training frame multiplexed with one or more data frames to the second UE; to transmit the SCI in a PSCCH of the generated beam training frame based on a previously transmitted PSSCH transmission that reserves time-frequency resources for the generated beam training frame; and to transmit SCI in the previously transmitted beam training frame for an on-demand beam training procedure that reserves time-frequency resources for a generated beam training frame.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the cellular baseband processor 1104, includes means for determining that a BPL with a second UE has degraded below a threshold; means for generating, based on the determination that the BPL with the second UE has degraded below the threshold, a beam training frame for an on-demand beam training procedure including a first AGC symbol, SCI indicating that the beam training frame is for beam training, and one or more sets of an AGC symbol and beam sweeping reference signals; and means for transmitting the beam training frame multiplexed with one or more data frames to the second UE. The apparatus 1102 further includes means for determining, based on the determination that the BPL with the second UE has degraded below the threshold, that at least one of a transmit beam at the first UE or a receive beam at the second UE for the BPL is misaligned. The apparatus 1102 further includes means for determining a transmit beam for the BPL during an allocated beam training occasion before the determination that the BPL with the second UE has degraded below the threshold; and means for transmitting at least one of a PSSCH or a PSCCH through the determined transmit beam before the determination that the BPL with the second UE has degraded below the threshold, where the SCI in the beam training frame is transmitted with the determined transmit beam for the BPL. The apparatus 1102 further includes means for transmitting SCI in a previously transmitted beam training frame for the on-demand beam training procedure that reserves time-frequency resources for the generated beam training frame. The apparatus 1102 further includes means for transmitting the SCI in a PSCCH of the generated beam training frame based on a previously transmitted PSSCH transmission that reserves time-frequency resources for the generated beam training frame. The apparatus 1102 further includes means for communicating a RRC message with the second UE, the RRC message being based on the determination that the BPL with the second UE has degraded below the threshold, and where the RRC messages comprises at least one of: information indicating whether the on-demand beam training procedure is for beam refinement or a beam search; a time window for the on-demand beam training procedure; whether the on-demand training procedure is for a transmit beam sweep, a receive beam sweep, or both a transmit beam sweep and a receive beam sweep; or information indicating reporting occasions for receiving a measurement report associated with the on-demand training procedure.

The aforementioned means may be one or more of the aforementioned components of the apparatus 1102 configured to perform the functions recited by the aforementioned means. As described supra, the apparatus 1102 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
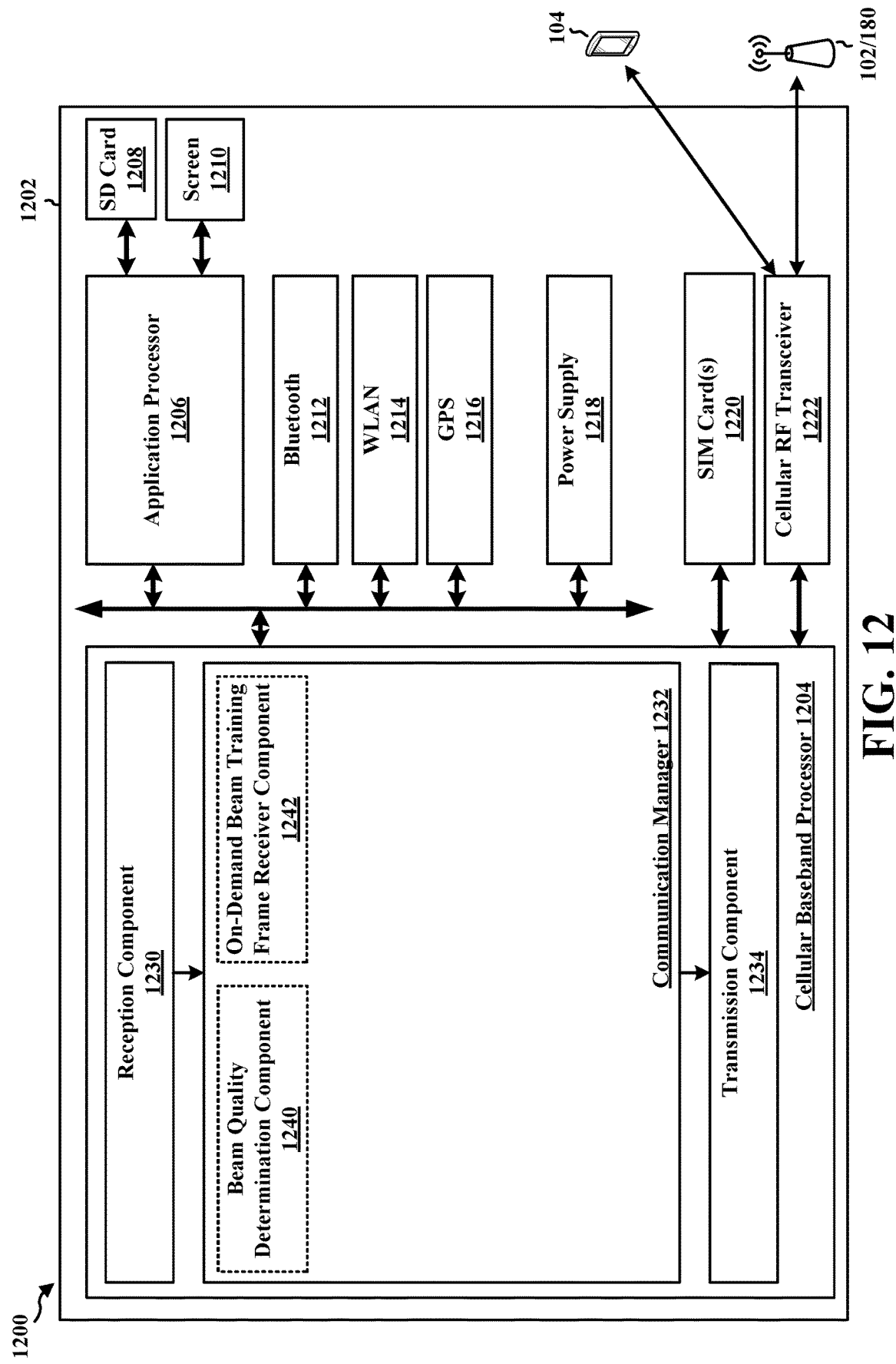
FIG. 12 is a diagram illustrating an example of a hardware implementation for an example apparatus.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the aforediscussed additional modules of the apparatus 1202.

The communication manager 1232 includes a beam quality determination component 1240 that is configured, e.g., as described in connection with 1002, to determine that a BPL with a first UE has degraded below a threshold. The communication manager 1232 further includes an on-demand beam training frame receiver component 1242 that is configured, e.g., as described in connection with 1004, to receive, based on the determination that the BPL with the first UE has degraded below the threshold, a beam training frame for an on-demand beam training procedure including a first AGC symbol, SCI indicating that the beam training frame is for beam training, and one or more sets of an AGC symbol and beam sweeping reference signals—the beam training frame is received with one or more data frames multiplexed with the beam training frame.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for determining that a BPL with a first UE has degraded below a threshold; and means for receiving, based on the determination that the BPL with the first UE has degraded below the threshold, a beam training frame for an on-demand beam training procedure including a first AGC symbol, SCI indicating that the beam training frame is for beam training, and one or more sets of an AGC symbol and beam sweeping reference signals, the beam training frame being received with one or more data frames multiplexed with the beam training frame. The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Accordingly, the first UE may generate a beam training frame for performing an on-demand beam training procedure to improve a condition of the BPL between the first UE and the second UE when the BPL is determined to have degraded but has not yet failed, rather than waiting for a next scheduled network-wide/system-wide beam training occasion to improve the condition of the BPL. The beam training frame may include a BTRS that is multiplexed with one or more data transmissions and may be transmitted on-demand from the first UE to the second UE. Upon performing the on-demand beam training procedure based on the beam training frame that multiplexes the BTRS with the one or more data transmissions, a quality of the BPL between the first UE and the second UE may be improved prior to a time of the next network-wide/system-wide beam training occasion.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a first UE, comprising: determining that a BPL with a second UE has degraded below a threshold; generating, based on the determination that the BPL with the second UE has degraded below the threshold, a beam training frame for an on-demand beam training procedure including a first AGC symbol, SCI indicating that the beam training frame is for beam training, and one or more sets of an AGC symbol and beam sweeping reference signals; and transmitting the beam training frame multiplexed with one or more data frames to the second UE.

Aspect 2 may be combined with aspect 1 and further includes that the determination that the BPL with the second UE has degraded below the threshold occurs at a time between two system-wide allocated beam training occasions.

Aspect 3 may be combined with any of aspects 1-2 and further includes that the BPL with the second UE is determined to have degraded below the threshold when a received power measured at the second UE over a RS of the beam sweeping RSs has degraded below the threshold.

Aspect 4 may be combined with any of aspects 1-3 and further includes that the one or more sets of the AGC symbol and the beam sweeping RS comprises a plurality of sets of the AGC symbol and the beam sweeping RS.

Aspect 5 may be combined with any of aspects 1-4 and further comprises determining, based on the determination that the BPL with the second UE has degraded below the threshold, that at least one of a transmit beam at the first UE or a receive beam at the second UE for the BPL is misaligned.

Aspect 6 may be combined with any of aspects 1-5 and further includes that each set of the AGC symbol and the beam sweeping RS corresponds to a same transmit beam direction when the transmit beam at the first UE for the BPL is determined to be aligned and the receive beam at the second UE for the BPL is determined to be misaligned.

Aspect 7 may be combined with any of aspects 1-6 and further includes that each set of the AGC symbol and the beam sweeping RS corresponds to a different transmit beam direction when the transmit beam at the first UE for the BPL is determined to be misaligned.

Aspect 8 may be combined with any of aspects 1-7 and further comprises determining a transmit beam for the BPL during an allocated beam training occasion before the determination that the BPL with the second UE has degraded below the threshold; and transmitting at least one of a PSSCH or a PSCCH through the determined transmit beam before the determination that the BPL with the second UE has degraded below the threshold, where the SCI in the beam training frame is transmitted with the determined transmit beam for the BPL.

Aspect 9 may be combined with any of aspects 1-8 and further includes that the SCI in the beam training frame further indicates at least one of a TCI state ID indicating a QCL assumption with respect to the determined transmit beam for the BPL for each set of the AGC symbol and the beam sweeping RS of the one or more sets of the AGC symbol and the beam sweeping RS.

Aspect 10 may be combined with any of aspects 1-9 and further includes that the beam training frame is further generated to include data, and the SCI indicates that the beam training frame includes the data.

Aspect 11 may be combined with any of aspects 1-10 and further includes that the SCI in the beam training frame reserves future time-frequency resources for a subsequent beam training frame for the on-demand beam training procedure.

Aspect 12 may be combined with any of aspects 1-11 and further comprises transmitting SCI in a previously transmitted beam training frame for the on-demand beam training procedure that reserves time-frequency resources for the generated beam training frame.

Aspect 13 may be combined with any of aspects 1-11 and further comprises transmitting the SCI in a PSCCH of the generated beam training frame based on a previously transmitted PSSCH transmission that reserves time-frequency resources for the generated beam training frame.

Aspect 14 may be combined with any of aspects 1-13 and further comprises communicating a RRC message with the second UE, the RRC message being based on the determination that the BPL with the second UE has degraded below the threshold, and wherein the RRC messages comprises at least one of: information indicating whether the on-demand beam training procedure is for beam refinement or a beam search; a time window for the on-demand beam training procedure; whether the on-demand training procedure is for a transmit beam sweep, a receive beam sweep, or both a transmit beam sweep and a receive beam sweep; or information indicating reporting occasions for receiving a measurement report associated with the on-demand training procedure.

Aspect 15 is a method of wireless communication of a second UE, comprising: determining that a BPL with a first UE has degraded below a threshold; and receiving, based on the determination that the BPL with the first UE has degraded below the threshold, a beam training frame for an on-demand beam training procedure including a first AGC symbol, SCI indicating that the beam training frame is for beam training, and one or more sets of an AGC symbol and beam sweeping reference signals, the beam training frame being received with one or more data frames multiplexed with the beam training frame.

Aspect 16 is an apparatus for wireless communication including at least one processor coupled to a memory and configured to implement a method as in any of aspects 1-15.

Aspect 17 is an apparatus for wireless communication including means for implementing a method as in any of aspects 1-15.

Aspect 18 is a computer-readable medium storing computer executable code, the code when executed by at least one processor causes the at least one processor to implement a method as in any of aspects 1-15.

What is claimed is:

1. A method of wireless communication of a first user equipment (UE), comprising:
    determining that a beam pair link (BPL) with a second UE has degraded below a threshold;
    generating, based on the determination that the BPL with the second UE has degraded below the threshold, a beam training frame associated with an on-demand beam training procedure, the beam training frame including a first automatic gain control (AGC) symbol, sidelink control information (SCI) indicating that the beam training frame is associated with beam training, one or more sets of an AGC symbol and beam sweeping reference signals (RSs), and data, wherein the SCI indicates that the beam training frame includes the data;
    transmitting the beam training frame multiplexed with one or more data frames to the second UE; and
    performing the on-demand beam training procedure based on the transmitted beam training frame.

2. The method of claim 1, wherein the determination that the BPL with the second UE has degraded below the threshold occurs at a time between two system-wide allocated beam training occasions.

3. The method of claim 1, wherein the BPL with the second UE is determined to have degraded below the threshold when a received power measured at the second UE over a RS of the beam sweeping RSs has degraded below the threshold.

4. The method of claim 1, wherein the one or more sets of the AGC symbol and a beam sweeping RS comprises a plurality of sets of the AGC symbol and the beam sweeping RS.

5. The method of claim 4, further comprising determining, based on the determination that the BPL with the second UE has degraded below the threshold, that at least one of a transmit beam at the first UE or a receive beam at the second UE for the BPL is misaligned.

6. The method of claim 5, wherein each set of the AGC symbol and the beam sweeping RS corresponds to a same transmit beam direction when the transmit beam at the first UE for the BPL is determined to be aligned and the receive beam at the second UE for the BPL is determined to be misaligned.

7. The method of claim 5, wherein each set of the AGC symbol and the beam sweeping RS corresponds to a different transmit beam direction when the transmit beam at the first UE for the BPL is determined to be misaligned.

8. The method of claim 1, further comprising:
    determining a transmit beam for the BPL during an allocated beam training occasion before the determination that the BPL with the second UE has degraded below the threshold; and
    transmitting at least one of a physical sidelink shared channel (PSSCH) or a physical sidelink control channel (PSCCH) through the determined transmit beam before the determination that the BPL with the second UE has degraded below the threshold,
    wherein the SCI in the beam training frame is transmitted with the determined transmit beam for the BPL.

9. The method of claim 8, wherein the SCI in the beam training frame further indicates at least one of a transmission configuration indicator (TCI) state identifier (ID) indicating a quasi-colocation (QCL) assumption with respect to the determined transmit beam for the BPL for each set of the AGC symbol and a beam sweeping RS of the one or more sets of the AGC symbol and the beam sweeping RS.

10. The method of claim 1, wherein the SCI in the beam training frame reserves future time-frequency resources for a subsequent beam training frame associated with the on-demand beam training procedure.

11. The method of claim 1, further comprising transmitting first SCI in a previously transmitted beam training frame associated with the on-demand beam training procedure that reserves time-frequency resources for the generated beam training frame.

12. The method of claim 1, further comprising transmitting the SCI in a physical side link control channel (PSCCH) of the generated beam training frame based on a previously transmitted physical sidelink shared channel (PSSCH) transmission that reserves time-frequency resources for the generated beam training frame.

13. The method of claim 1, further comprising communicating a radio resource control (RRC) message with the second UE, the RRC message being based on the determination that the BPL with the second UE has degraded below the threshold, and wherein the RRC messages comprises at least one of:
    information indicating whether the on-demand beam training procedure is associated with beam refinement or a beam search;
    a time window for the on-demand beam training procedure;
    whether the on-demand training procedure is for a transmit beam sweep, a receive beam sweep, or both the transmit beam sweep and the receive beam sweep; or
    information indicating reporting occasions for receiving a measurement report associated with the on-demand training procedure.

14. A method of wireless communication of a second user equipment (UE), comprising:
    determining that a beam pair link (BPL) with a first UE has degraded below a threshold;
    receiving, based on the determination that the BPL with the first UE has degraded below the threshold, a beam training frame associated with an on-demand beam training procedure, the beam training frame including a first automatic gain control (AGC) symbol, sidelink control information (SCI) indicating that the beam training frame is associated with beam training, and one or more sets of an AGC symbol and beam sweeping reference signals (RSs), and data, the beam training frame being received with one or more data frames multiplexed with the beam training frame, wherein the SCI indicates that the beam training frame includes the data; and
    performing the on-demand beam training procedure based on the received beam training frame.

15. An apparatus for wireless communication of a first user equipment (UE), comprising:
    a memory; and
    at least one processor coupled to the memory and configured to:

determine that a beam pair link (BPL) with a second UE has degraded below a threshold;

generate, based on the determination that the BPL with the second UE has degraded below the threshold, a beam training frame associated with an on-demand beam training procedure, the beam training frame including a first automatic gain control (AGC) symbol, sidelink control information (SCI) indicating that the beam training frame is associated with beam training, one or more sets of an AGC symbol and beam sweeping reference signals (RSs), and data, wherein the SCI indicates that the beam training frame includes the data;

transmit the beam training frame multiplexed with one or more data frames to the second UE; and perform the on-demand beam training procedure based on the transmitted beam training frame.

16. The apparatus of claim 15, wherein to determine that the BPL with the second UE has degraded below the threshold, the at least one processor is configured to determine that the BPL with the second UE has degraded below the threshold at a time between two system-wide allocated beam training occasions.

17. The apparatus of claim 15, wherein to determine that the BPL with the second UE has degraded below the threshold, the at least one processor is configured to determine that the BPL with the second UE has degraded below the threshold when a received power measured at the second UE over a RS of the beam sweeping RSs has degraded below the threshold.

18. The apparatus of claim 15, wherein the one or more sets of the AGC symbol and a beam sweeping RS comprises a plurality of sets of the AGC symbol and the beam sweeping RS.

19. The apparatus of claim 18, wherein the at least one processor is further configured to determine, based on the at least one processor being configured to determine that the BPL with the second UE has degraded below the threshold, that at least one of a transmit beam at the first UE or a receive beam at the second UE for the BPL is misaligned.

20. The apparatus of claim 19, wherein each set of the AGC symbol and the beam sweeping RS corresponds to a same transmit beam direction when the at least one processor is configured to determine that the transmit beam at the first UE for the BPL is determined to be aligned and the receive beam at the second UE for the BPL is misaligned.

21. The apparatus of claim 19, wherein each set of the AGC symbol and the beam sweeping RS corresponds to a different transmit beam direction when the at least one processor is configured to determine that the transmit beam at the first UE for the BPL is misaligned.

22. The apparatus of claim 15, wherein the at least one processor is further configured to:
determine a transmit beam for the BPL during an allocated beam training occasion before the at least one processor is configured to determine that the BPL with the second UE has degraded below the threshold; and
transmit at least one of a physical sidelink shared channel (PSSCH) or a physical sidelink control channel (PSCCH) through the determined transmit beam before the at least one processor is configured to determine that the BPL with the second UE has degraded below the threshold,
wherein to transmit the SCI in the beam training frame, the at least one processor is configured to transmit the determined transmit beam for the BPL.

23. The apparatus of claim 22, wherein the SCI in the beam training frame further indicates at least one of a transmission configuration indicator (TCI) state identifier (ID) indicating a quasi-colocation (QCL) assumption with respect to the determined transmit beam for the BPL for each set of the AGC symbol and a beam sweeping RS of the one or more sets of the AGC symbol and the beam sweeping RS.

24. The apparatus of claim 15, wherein the SCI in the beam training frame reserves future time-frequency resources for a subsequent beam training frame associated with the on-demand beam training procedure.

25. The apparatus of claim 15, wherein the at least one processor is further configured to transmit first SCI in a previously transmitted beam training frame associated with the on-demand beam training procedure that reserves time-frequency resources for the generated beam training frame.

26. The apparatus of claim 15, wherein the at least one processor is further configured to transmit the SCI in a physical sidelink control channel (PSCCH) of the generated beam training frame based on a previously transmitted physical sidelink shared channel (PSSCH) transmission that reserves time-frequency resources for the generated beam training frame.

27. The apparatus of claim 15, wherein the at least one processor is further configured to communicate a radio resource control (RRC) message with the second UE, the RRC message being based on the at least one processor being configured to determine that the BPL with the second UE has degraded below the threshold, and wherein the RRC messages comprises at least one of:

information indicating whether the on-demand beam training procedure is associated with beam refinement or a beam search;

a time window for the on-demand beam training procedure;

whether the on-demand training procedure is for a transmit beam sweep, a receive beam sweep, or both the transmit beam sweep and the receive beam sweep; or information indicating reporting occasions for receiving a measurement report associated with the on-demand training procedure.

28. An apparatus for wireless communication of a second user equipment (UE), comprising:

a memory; and at least one processor coupled to the memory and configured to:

determine that a beam pair link (BPL) with a first UE has degraded below a threshold;

receive, based on the determination that the BPL with the first UE has degraded below the threshold, a beam training frame associated with an on-demand beam training procedure, the beam training frame including a first automatic gain control (AGC) symbol, sidelink control information (SCI) indicating that the beam training frame is associated with beam training, one or more sets of an AGC symbol and beam sweeping reference signals (RSs), and data, the beam training frame being received with one or more data frames multiplexed with the beam training frame, wherein the SCI indicates that the beam training frame includes the data; and perform the on-demand beam training procedure based on the received beam training frame.

* * * * *